(12) United States Patent
Lee et al.

(10) Patent No.: US 11,446,981 B2
(45) Date of Patent: Sep. 20, 2022

(54) VEHICLE AIR CONDITIONER

(71) Applicant: Hanon Systems, Daejeon (KR)

(72) Inventors: Se Min Lee, Daejeon (KR); Dae Bok Keon, Daejeon (KR); Yun Jin Kim, Daejeon (KR); Jae Chun Ryu, Daejeon (KR); Yo Chan Min, Daejeon (KR); Tae Yong Park, Daejeon (KR); Sung Je Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 222 days.

(21) Appl. No.: 16/761,831

(22) PCT Filed: Dec. 24, 2018

(86) PCT No.: PCT/KR2018/016588
§ 371 (c)(1),
(2) Date: May 6, 2020

(87) PCT Pub. No.: WO2019/132481
PCT Pub. Date: Jul. 4, 2019

(65) Prior Publication Data
US 2021/0197647 A1    Jul. 1, 2021

(30) Foreign Application Priority Data

Dec. 27, 2017 (KR) .......................... 10-2017-0180493

(51) Int. Cl.
*B60H 1/00* (2006.01)

(52) U.S. Cl.
CPC ..... *B60H 1/00564* (2013.01); *B60H 1/00064* (2013.01); *B60H 1/00328* (2013.01); *B60H 2001/00092* (2013.01); *B60H 2001/00121* (2013.01); *B60H 2001/00135* (2013.01); *B60H 2001/00178* (2013.01); *B60H 2001/00192* (2013.01); *B60H 2001/00214* (2013.01)

(58) Field of Classification Search
CPC ...... B60H 1/00064; B60H 2001/00178; B60H 2001/00192
See application file for complete search history.

(56) References Cited

U.S. PATENT DOCUMENTS

2015/0082820 A1* 3/2015 Takahashi .......... B60H 1/00035
62/238.7

FOREIGN PATENT DOCUMENTS

| JP | 2004182157 A | 7/2004 |
|---|---|---|
| JP | 2004237880 A | 8/2004 |
| JP | 2007131137 A | 5/2007 |
| JP | 2013133068 A | 7/2013 |
| JP | 2017504518 A | 2/2017 |

(Continued)

OTHER PUBLICATIONS

International Search Report and Written Opinion dated Mar. 27, 2019 for International Patent Application No. PCT/KR2018/016588 (with English Translation of International Search Report).

*Primary Examiner* — Eric S Ruppert
(74) *Attorney, Agent, or Firm* — Dickinson Wright PLLC

(57) ABSTRACT

Disclosed is a vehicle air conditioning device, which is an air conditioning device using an integrated heat pump system, and in which left and right independent air conditionings can be implemented in a simple structure such that the left and right air volumes may be automatically controlled, the ability to mix hot and cold air is improved, and sufficient space can be secured inside a vehicle.

12 Claims, 13 Drawing Sheets

(56) References Cited

FOREIGN PATENT DOCUMENTS

| | | | |
|---|---|---|---|
| KR | 20050120158 A | * | 12/2005 |
| KR | 20160121730 A | | 10/2016 |
| KR | 20160129167 A | | 11/2016 |
| KR | 20170018995 A | | 2/2017 |
| WO | WO2013105201 A1 | * | 7/2013 |

* cited by examiner

PRIOR ART

PRIOR ART

VEHICLE AIR CONDITIONER

CROSS-REFERENCE TO RELATED APPLICATIONS

This application is a U.S. National Stage of International Patent Application Serial No. PCT/KR2018/016588, filed Dec. 24, 2018, which claims the benefit of Korean Patent Application Serial No. 10-2017-0180493, filed Dec. 27, 2017. The entire disclosures of each of the above applications are incorporated herein by reference.

TECHNICAL FIELD

The present invention relates to an air conditioner for a vehicle, and more particularly, to an air conditioner for a vehicle, which includes an evaporator and a condenser respectively mounted in a first air passageway and a second air passageway inside an air-conditioning case in order to perform cooling and heating in an integrated type.

BACKGROUND ART

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

Such an air conditioner includes: a compressor for compressing and discharging refrigerant; a condenser for condensing the refrigerant of high pressure discharged from the compressor; an expansion valve for throttling the refrigerant condensed and liquefied in the condenser; and an evaporator for exchanging heat between the liquefied refrigerant of low pressure throttled by the expansion valve and air blown to the interior of the vehicle and evaporating the refrigerant to cool the air discharged to the interior of the vehicle due to heat absorption by evaporative latent heat, and a cooling cycle of the air conditioner is configured such that the compressor, the condenser, the expansion valve and the evaporator are connected with each other via refrigeration pipes.

Recently, heat pump systems which perform heating and cooling only using the cooling cycle have been developed. Especially, most of eco-friendly electric vehicles, such as electric vehicles and fuel cell vehicles, adopt a heat pump system capable of heating and cooling the interior of the vehicle without engine coolant since not using engine coolant as a heating heat source.

FIG. 1 is a sectional view showing a conventional air conditioner for a vehicle, and FIG. 2 is a plan view showing the conventional air conditioner for a vehicle. As shown in FIGS. 1 and 2, the air conditioner for a vehicle of a heat pump system includes an air-conditioning module 1 for generating cold air and warm air; and a distribution duct 2 for distributing the cold air and the warm air generated from the air-conditioning module 1 to the interior of the vehicle.

The air-conditioning module 1 includes an air-conditioning case 3 of which the inside is divided into a cold air passageway 3a of a lower side and a warm air passageway 3b of an upper side. A cooling heat exchanger 4 and a cold air adjusting door 5 are disposed in the cold air passageway 3a, and a heating heat exchanger 6 and a warm air adjusting door 7 are disposed in the warm air passageway 3b.

The distribution duct 2 includes an interior passageway 2a communicating with the cold and warm air passageways 3a and 3b of the air-conditioning module 1, and a plurality of discharge vents 2b branching from the internal passageway 2a. The distribution duct 2 discharges the cold air and the warm air blown from the cold and warm air passageways 3a and 3b of the air-conditioning module 1 to various parts of the interior of the vehicle in order to cool and heat the interior of the vehicle. An electric heater 2c acting as an auxiliary heat source in a heating mode may be disposed inside the distribution duct 2.

The air-conditioning module 1 is arranged at an engine room, which is located outside the vehicle on the basis of a dash panel 10, and the distribution duct 2 is arranged inside the vehicle. Moreover, an indoor air inflow duct for guiding indoor air to the inside of the air-conditioning module 1 is mounted inside the vehicle.

In a cooling mode, the indoor air and the outdoor air blown from a first blower 8 to the cold air passageway 3a are sent to the cooling heat exchanger 4 to be cooled, and the cooled air is blown toward the distribution duct 2 by adjustment of the cold air adjusting door 5. In this instance, the warm air of the warm air passageway 3b heated by the heating heat exchanger 6 is discharged to the outside through a warm air discharge hole 7a by control of the warm air adjusting door 7.

In the heating mode, the indoor air and the outdoor air blown from the second blower 9 to the warm air passageway 3b is heated by the heating heat exchanger 6, and the heated air is blown toward the distribution duct 2 by adjustment of the warm air adjusting door 7. In this instance, the cold air of the cold air passageway 3a cooled by the cooling heat exchanger 4 is discharged to the outside through a cold air discharge hole 5a by control of the cold air adjusting door 5.

Furthermore, in the heating mode, if it is necessary to dehumidify the interior of the vehicle, the cold air of the cold air passageway 3a bypasses toward the warm air passageway 3b through a bypass passageway 3c and a bypass door 3d, in order to supply cold air to the interior of the vehicle to dehumidify the interior of the vehicle.

The conventional integrated type air conditioner cannot realize independent right and left air-conditioning to independently perform air-conditioning to the left side and the right slide, namely, the driver's seat and the passenger's seat, in a width direction of the vehicle by the nature of a flow path. Moreover, in case of the conventional integrated type air conditioner in which the cold air passageway and the warm air passageway are partitioned, a passenger who sits on the right side or the left side must open and close a grill manually to control the air volume when he or she wants independent right-and-left air-conditioning.

In addition, the conventional integrated type air conditioner has a disadvantage in that cannot smoothly mix warm air and cold air in a mixing zone where the warm air and the cold air meet and are mixed together and it causes a temperature difference between the right side and the left side.

Additionally, the conventional integrated type air conditioner has several disadvantages in that the structure of the flow path is complicated, manufacturing costs are expensive due to lots of components, a binding force is limited, and a space for passenger gets narrow since some of the components are arranged in the interior of the vehicle.

Disclosure

Technical Problem

Accordingly, the present invention has been made in view of the above-mentioned problems occurring in the prior art, and it is an object of the present invention to provide an air conditioner of an integrated type heat pump system which can automatically control the air volume of the right side and the left side since realize independent right-and-left air-conditioning by a simple structure, improve mixability of cold air and warm air, and secure a sufficient interior space.

Technical Solution

To accomplish the above object, according to the present invention, there is provided an air conditioner for a vehicle including: a first air passageway and a second air passageway, a heating heat exchanger disposed in one among the first air passageway and the second air passageway and a cooling heat exchanger disposed in the other one among the first air passageway and the second air passageway, wherein air passing at least one among the heating heat exchanger and the cooling heat exchanger is independently discharged to different zones in the interior of the vehicle.

Advantageous Effects

As described above, the air conditioner for a vehicle according to the present invention can control the air volume and temperature of the right side and the left side, as a passenger wants, through manipulation of a controller or automatic control, and provide constant air-conditioning without any change in air volume of the opposite side even though one among the right side and the left side is turned off.

MODE FOR INVENTION

Figure 1:
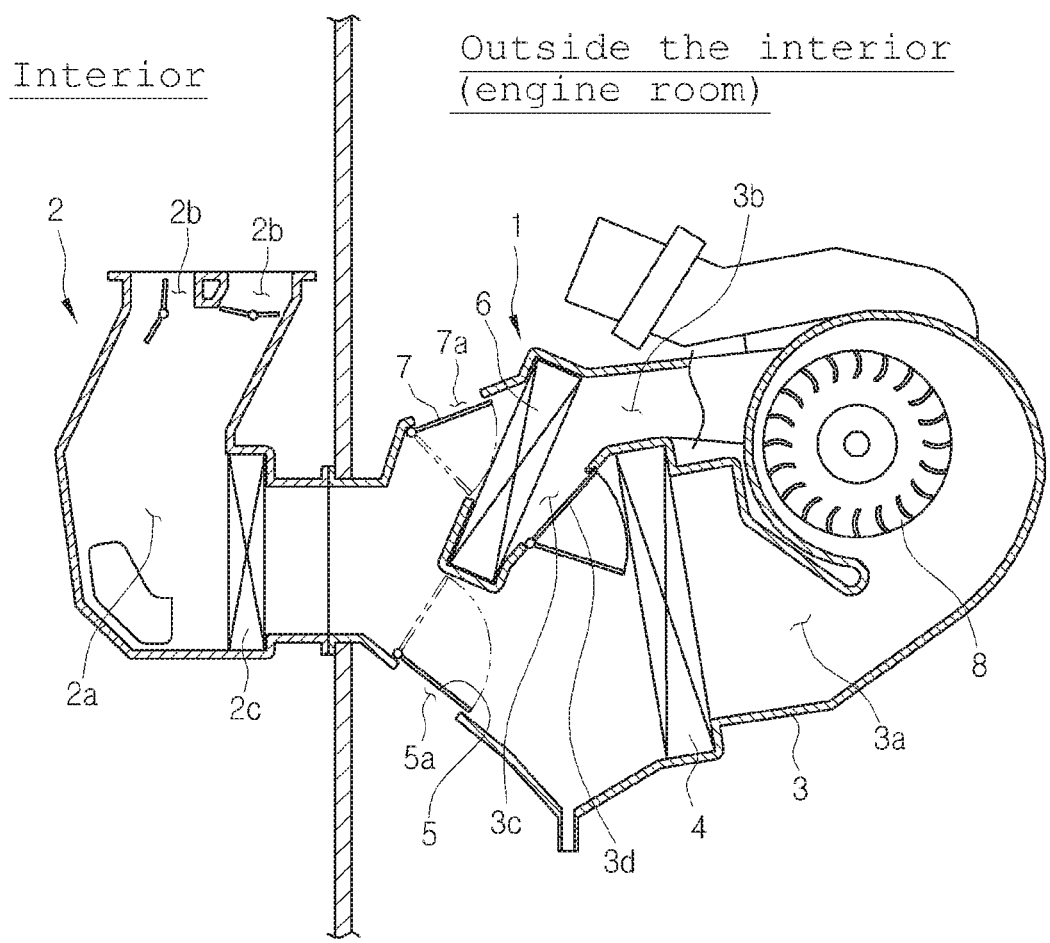
FIG. 1 is a sectional view showing a conventional air conditioner for a vehicle.
Figure 2:
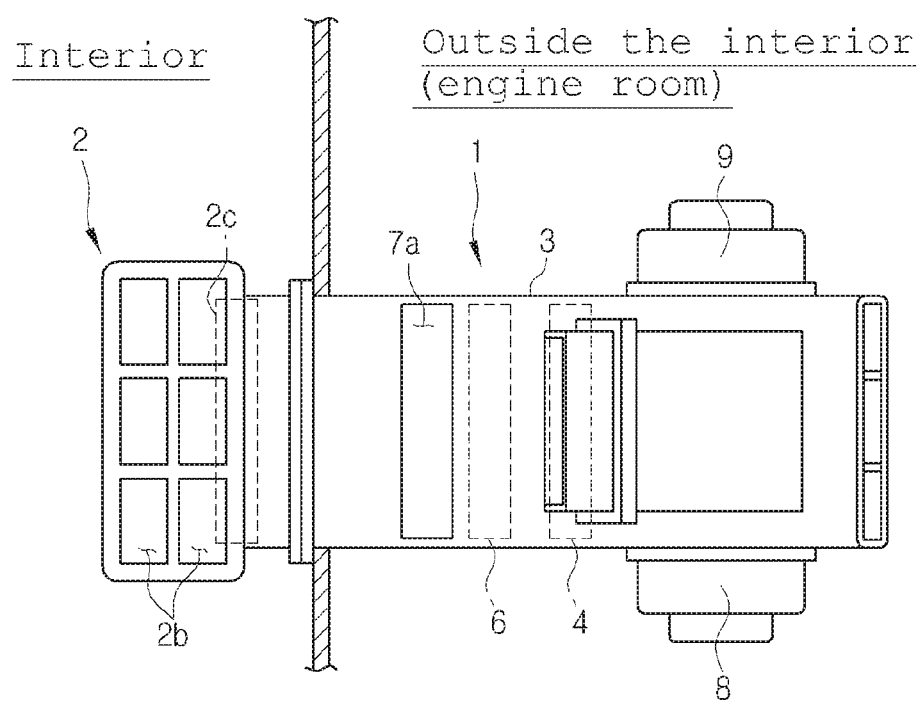
FIG. 2 is a plan view showing the conventional air conditioner for a vehicle.
Figure 3:
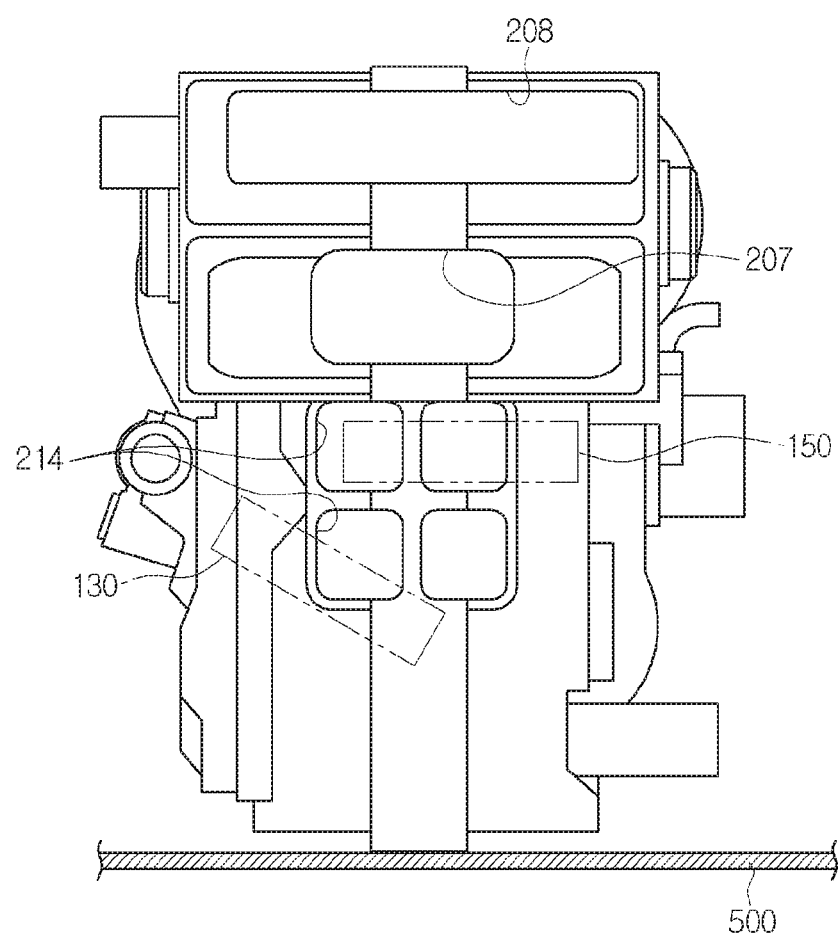
FIG. 3 is a plan view showing an air conditioner for a vehicle according to a preferred embodiment of the present invention.

Hereinafter, a technical structure of an air conditioner for a vehicle according to an embodiment of the present invention will be described in detail with reference to the accompanying drawings.

As shown in FIGS. 3 to 11, the air conditioner for a vehicle according to a preferred embodiment of the present invention has a heat pump system with an integrated air-conditioning type, and includes an air-conditioning module 100 and a mixing-duct module 200.

The air-conditioning module 100 includes at least one among a heating heat exchanger and a cooling heat exchanger, which exchange heat with air. The mixing-duct module 200 includes an intake module and a distributor module which are formed integrally. The intake module introduces at least one of indoor air or outdoor air to the air-conditioning module 100. The distributor module discharges air blown from the air-conditioning module 100 to parts of the interior of the vehicle.

The air-conditioning module 100 includes an air-conditioning case 110, an evaporator 150 which is the cooling heat exchanger, a condenser 130 which is the heating heat exchanger, a compressor, an expansion valve, and a blower unit.

The air-conditioning case 110 includes a first air passageway 101 which is a cooling passageway and a second air passageway 102 which is a heating passageway, and the first air passageway 101 and the second air passageway 102 are partitioned from each other inside the air-conditioning case 110 by a partition wall 119. Indoor air or outdoor air is selectively introduced through the first air passageway 101, and indoor air or outdoor air is selectively introduced also through the second air passageway 102.

The evaporator 150 which is the cooling heat exchanger is disposed in the first air passageway 101. The evaporator 150 exchanges heat between liquid-phase refrigerant of low pressure discharged from the expansion valve, which will be described later, and the inside air of the air-conditioning case 110 so as to cool air due to heat absorption by evaporative latent heat of refrigerant.

The condenser 130 which is the heating heat exchanger is disposed in the second air passageway 102. The condenser 130 exchanges heat between gas-phase refrigerant of high-temperature and high-pressure discharged from the compressor, which will be described later. In this process, the refrigerant is condensed and air is heated.

The compressor is an electro-compressor actuated by electric energy. The compressor inhales and compresses gas-phase refrigerant of low-temperature and low-pressure passing through the evaporator 150, and then, discharges the refrigerant in a gas phase of high-temperature and high-pressure to the condenser 130.

The expansion valve rapidly expands the liquid-phase refrigerant discharged from the condenser 130 by a throttling action, and sends the refrigerant in a wet-saturated state of low-temperature and low-pressure to the evaporator 150. The expansion valve may adopt one of an EXV, a TXV, and an orifice structure. The compressor, the condenser 130, the expansion valve and the evaporator 150 are disposed in a refrigerant line 150 in order.

The air conditioner for a vehicle is to selectively supply indoor air and outdoor air to the evaporator 150 and the condenser 130. In a cooling mode, the indoor air exchanges heat with the evaporator 150 and is supplied to the interior of the vehicle, and the indoor air exchanges heat with the condenser 130 and is discharged to the outside of the vehicle. In a heating mode, the indoor air exchanges heat with the condenser 130 and is supplied to the interior of the vehicle, and the outdoor air exchanges heat with the evaporator 150 and is discharged to the outside of the vehicle. However, a flow of air by each air-conditioning mode is not limited to this embodiment of the present invention.

The blower unit inhales indoor air or outdoor air into the first air passageway 101 and the second air passageway 102. The blower unit includes a blower motor and a blower wheel combined with the blower motor to be rotated. The blower unit may have an inhalation type structure to inhale air into the air-conditioning case 110.

The mixing-duct module 200 includes an intake module and a distributor module which are formed integrally. The distributor module discharges the air blown from at least one among the first air passageway 101 and the second air passageway 102 of the air-conditioning module 100 to parts of the interior of the vehicle.

The air-conditioning module 100, the intake module and the distributor module are all arranged outside on the basis of a dash panel 500 of the vehicle. Therefore, the air conditioner for a vehicle according to the present invention can increase a space for passengers by securing an interior space of the vehicle.

The mixing-duct module includes a mixing-duct case 210. The mixing-duct case 210 has an intake case of the intake unit for inhaling air and a distribution case of the distributor module for mixing heated air-conditioned air and discharging the mixed air to the interior of the vehicle, and the intake case and the distribution case are combined with each other in a horizontal direction.

Figure 4:
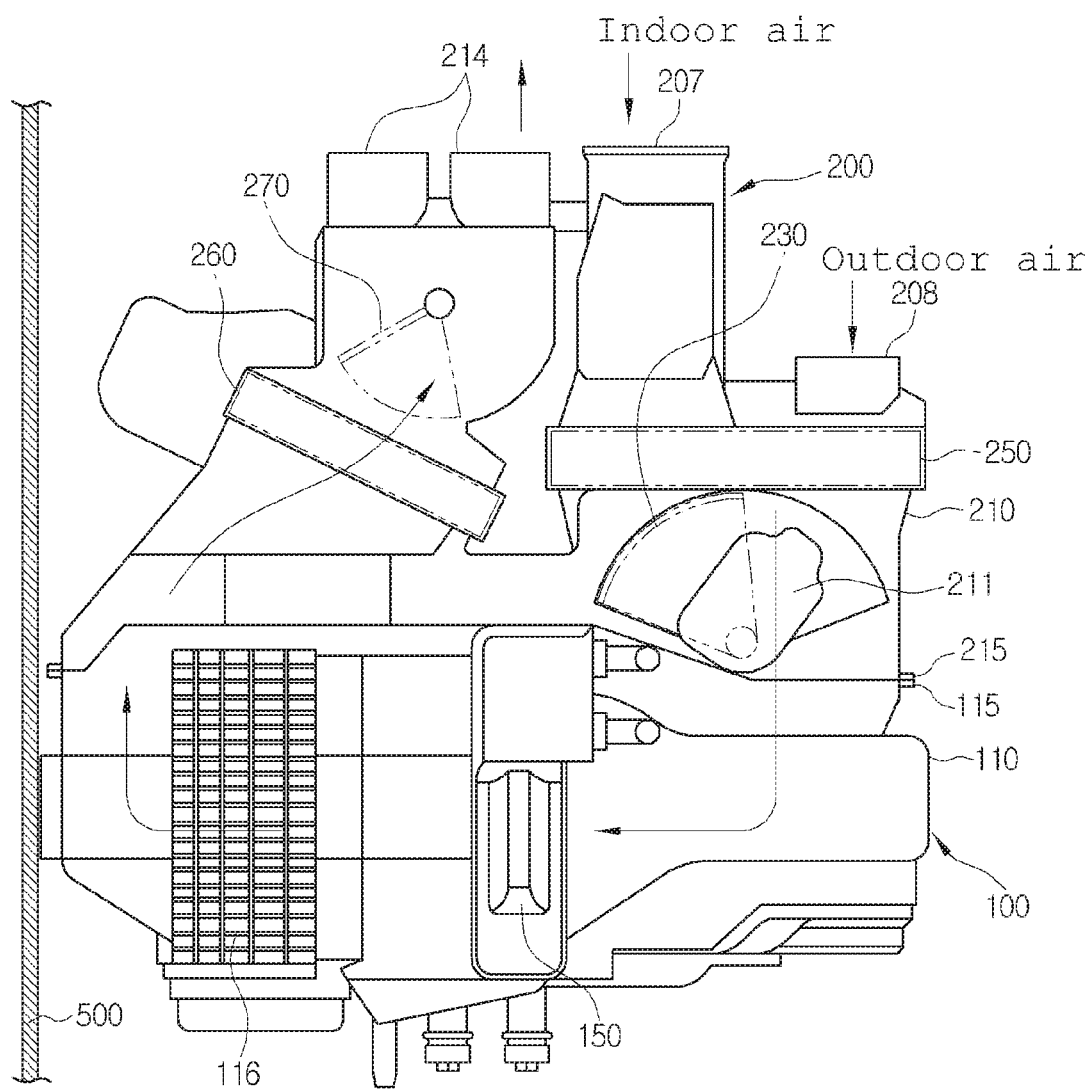
FIG. 4 is a side view showing the air conditioner for a vehicle according to the preferred embodiment of the present invention.
Figure 5:
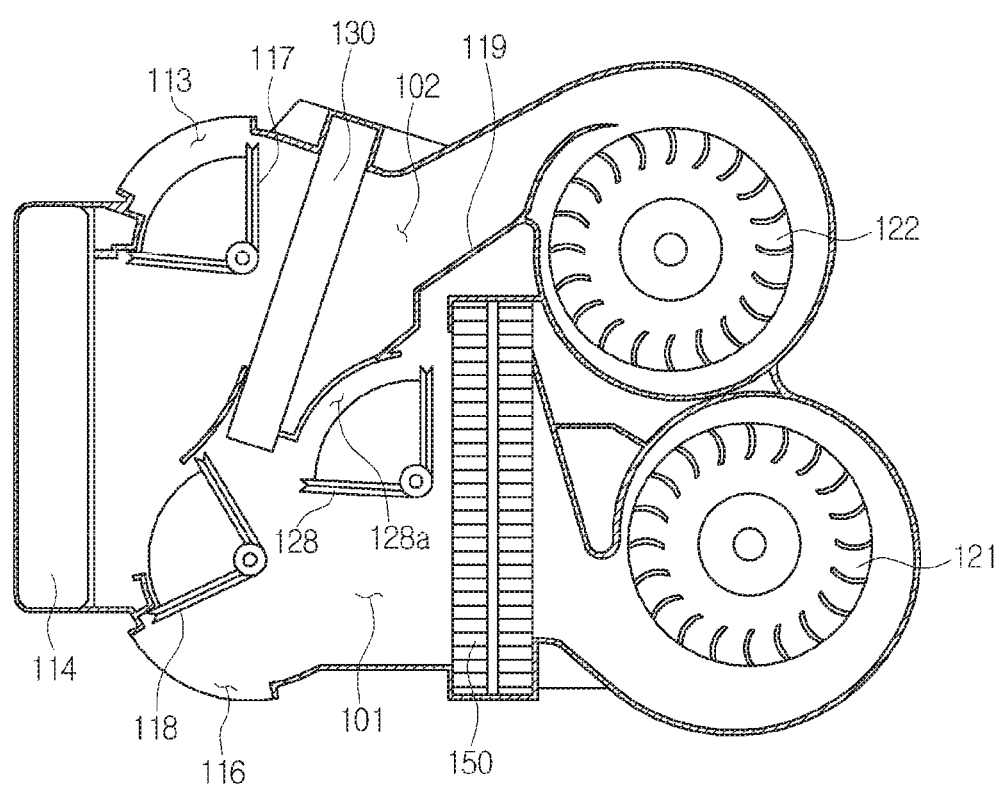
FIG. 5 is a to cross-sectional view showing the air conditioner for a vehicle according to the preferred embodiment of the present invention.
Figure 6:
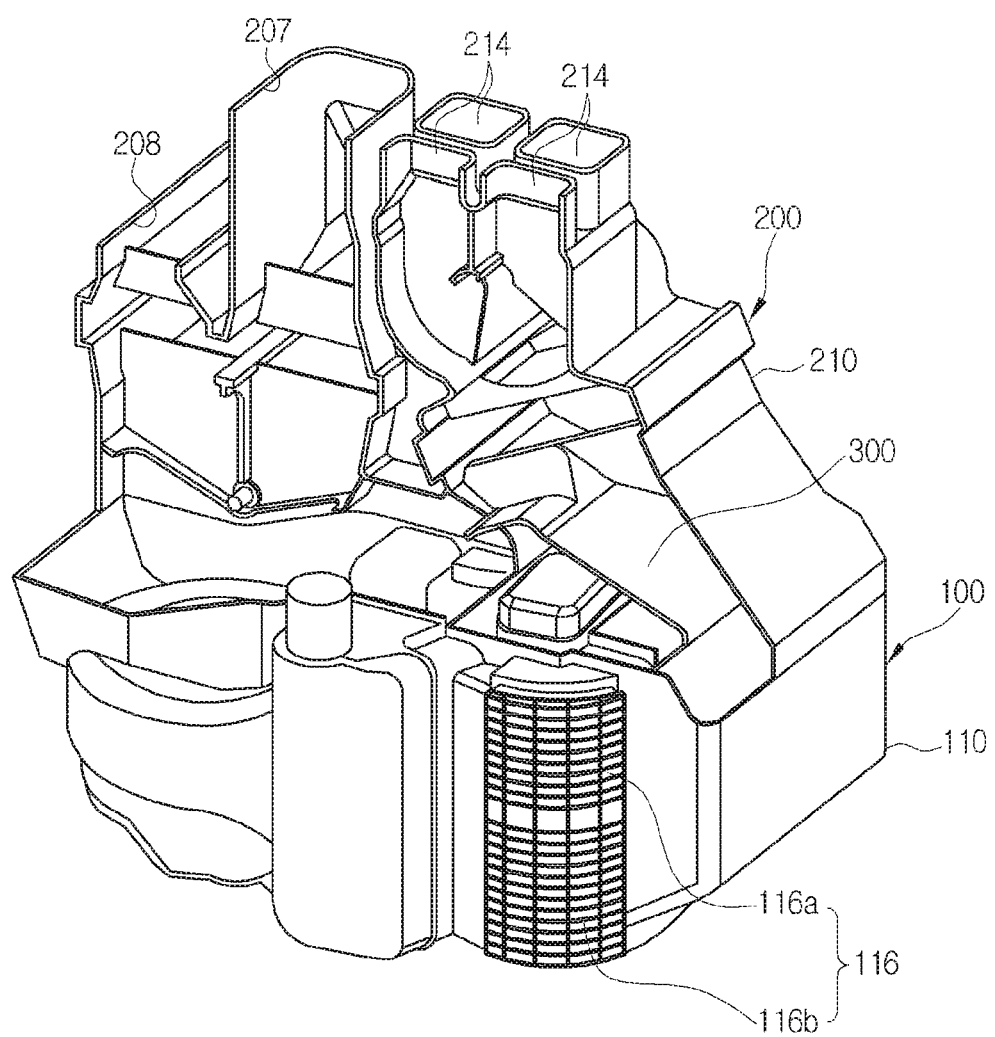
FIG. 6 is a perspective view, in partial section, of the air conditioner for a vehicle according to the preferred embodiment of the present invention.

That is, as shown in FIG. 4, the intake module and the distributor module are partitioned from each other in a back-and-forth direction of the vehicle, and then, are combined with each other integrally to form a single mixing-duct module 200. In this instance, the right side in FIG. 4 is the front side of the vehicle, and the left side is the rear side of the vehicle. The left side (rear side) based on the dash panel 500 is the interior space of the vehicle, and the right side is the outside (engine room) of the vehicle.

The air-conditioning case 110 and the mixing-duct case 210 are detachably coupled with each other through a means, such as a screw. The air-conditioning case 110 has a coupling portion 115, and the mixing-duct case 210 has another coupling portion 215 corresponding to the coupling portion 115, and the two coupling portions are coupled with each other through the screw. Preferably, the mixing-duct case 210 and the air-conditioning case 110 are coupled with each other in a vertical direction. More preferably, the mixing-duct case 210 is arranged on the air-conditioning case 110.

The mixing-duct case 210 includes an indoor air inlet 207, an outdoor air inlet 208, and a plurality of air outflow holes 214. The indoor air inlet 207 is to introduce indoor air into the air-conditioning case, and is connected to an indoor air inflow duct to inhale indoor air. The outdoor air inlet 208 is to introduce outdoor air into the air-conditioning case, and is connected to an outdoor air inflow duct to inhale outdoor air.

The indoor air inlet 207, the outdoor air inlet 208, and the air outflow holes 214 are all formed in the same direction. That is, the indoor air inlet 207, the outdoor air inlet 208, and the air outflow holes 214 are all opened upwardly. The air outflow hole 214 includes a roof vent for discharging air-conditioned air toward the ceiling, in the interior of the vehicle, and a floor vent for discharging the air-conditioned air toward the floor, in the interior of the vehicle. The mixing-duct module 200 may further include a PTC heater 260, which is an auxiliary heating heat source, at the distributor module. Moreover, a mode door 270 for selectively discharging air to the roof vent or the floor vent may be disposed at the front ends of the air outflow holes 214.

The mixing-duct module 200 includes a single air filter 250. The air filter 250 filters air introduced into the indoor air inlet 207 and the outdoor air inlet 208. The air-conditioning module 100 includes a first blower unit 121 and a second blower unit 122 respectively disposed in the first air passageway 101 and the second air passageway 102. The first blower unit 121 and the second blower unit 122 are arranged parallel in a horizontal direction. Additionally, the indoor air inlet 207 and the outdoor air inlet 208 of the mixing-duct case 210 are located above the second blower unit 122 to correspond to each other.

An indoor and outdoor air converting door 230 is disposed between the air filter 250 and the blower unit. The indoor and outdoor air converting door 230 is rotatably mounted on the mixing-duct case 210 and controls the degree of opening of the indoor air inlet 207 and the outdoor air inlet 208 so as to selectively introduce indoor air and outdoor air toward the air-conditioning module 100. The indoor and outdoor air converting door 230 is rotated by an actuator. The mixing-duct case 210 may include an actuator cover 211 formed integrally with the mixing-duct case to cover the actuator. Moreover, the mixing-duct case 210 includes a cover 271 formed integrally with the mixing-duct case to cover the actuator actuating the mode door 270.

The air conditioner for a vehicle has a generally "⌄" or "U" shaped passage through the structure that the air-conditioning module 100 and the mixing-duct module 200 are combined with each other vertically and the structure that the indoor air inlet 207 and the outdoor air inlet 208 are arranged at the upper part, a pair of the blower units 121 and 122 are arranged collaterally below the indoor air inlet 207 and the outdoor air inlet 208, the evaporator 150 and the condenser 130 are arranged in the horizontal direction relative to the blower units 121 and 122 and the plurality of air outflow holes 214 are located above the air-conditioning module 100.

That is, the air moves downwardly through the indoor air inlet 207 or the outdoor air inlet 208 of the mixing-duct module 200, exchanges heat with at least one of the heating heat exchanger and the cooling heat exchanger while moving in the horizontal direction in the air-conditioning module 100, and then, moves upwardly through the air outflow holes 214 of the mixing-duct module 200 so as to form an air flow of the "⊔" or "U" shape.

The air-conditioning module 100 includes a cold air discharge hole 116 formed at the downstream side of the evaporator 150 in the first air passageway 101, and a warm air discharge hole 113 formed at the downstream side of the condenser 130 in the second air passageway 102. The cold air discharge hole 116 is formed at the left side of the air-conditioning case 110, and the warm air discharge hole 113 is formed at the right side of the air-conditioning case 110. Moreover, the air-conditioning case 110 includes a communication passageway 114 formed at the downstream side of the evaporator 150 of the first air passageway 101 and at the downstream side of the condenser 130 of the second air passageway 102 to communicate with the mixing-duct module 200.

A cold air mode door 118 is rotatably disposed at the downstream side of the evaporator 150 of the first air passageway 101, and a warm air mode door 117 is rotatably disposed at the downstream side of the condenser 130 of the second air passageway 102. The cold air mode door 118 adjusts an amount of air heading the communication passageway 114 and an amount of air heading the cold air discharge hole 116, and the warm air mode door 117 adjusts an amount of air heading the communication passageway 114 and an amount of air heading the warm air discharge hole 113.

Furthermore, the air-conditioning module 100 includes a bypass door 128 and a bypass passageway 128a. In the heating mode, if it is necessary to dehumidify the interior of the vehicle, the cold air of the first air passageway 101 bypasses toward the second air passageway 102 through the bypass door 128 and the bypass passageway 128a. Therefore, the cold air toward the first air passageway 101 is supplied to the interior of the vehicle to dehumidify the interior of the vehicle.

The air conditioner for a vehicle is configured in such a way that the air passing at least one among the evaporator 150 and the condenser 130 is independently discharged to different zones in the interior of the vehicle. That is, the air passing at least one among the evaporator 150 and the condenser 130 is discharged to the right and the left of the interior of the vehicle to perform right and left air-conditioning independently.

As described above, the cooling heat exchanger and the cold air discharge hole 116 are disposed in the first air passageway 101, and the heating heat exchanger and the warm air discharge hole 113 are disposed in the second air passageway 102. Moreover, the cold air discharge hole 116 and the warm air discharge hole 113 are formed at right and left sides of the case in the vehicle width direction. In the meantime, the first air passageway 101 and the second air passageway 102 are partitioned by the partition wall 119 in the right and left direction, and are divided into an upper passageway 103 and a lower passageway 104 by a separator 300.

The evaporator 150 and the condenser 130 are vertically divided into two by the separator 300. The cold air mode door 118 is disposed at the first air passageway 101 in order to adjust the degree of opening between a flow path heading the cold air discharge hole 116 and a flow path heading the interior of the vehicle. The warm air mode door 117 is disposed in the second air passageway 102 in order to adjust the degree of opening between a flow path heading the warm air discharge hole 113 and the flow path heading the interior of the vehicle.

The cold air discharge hole 116 includes an upper cold air discharge hole 116a and a lower cold air discharge hole 116b. The upper cold air discharge hole 113 is formed on the lower cold air discharge hole 116b. The warm air discharge hole 113 includes an upper warm air discharge hole 113a and a lower warm air discharge hole 113b. The upper warm air discharge hole 113a is formed on the lower warm air discharge hole 113b.

The cold air mode door 118 is configured in such a way that the upper cold air mode door 118a and the lower cold air mode door 118b are actuated independently. Furthermore, the warm air mode door 117 is configured in such a way that the upper warm air mode door 117a and the lower warm air mode door 117b are actuated independently. The upper cold air mode door 118a adjusts the degree of opening of the upper cold air discharge hole 116a, and the lower cold air mode door 118b adjusts the degree of opening of the lower cold air discharge hole 116b. Additionally, the upper warm air mode door 117a adjusts the degree of opening of the warm air discharge hole 113a, and the lower warm air mode door 117b adjusts the degree of opening of the lower warm air discharge hole 113b.

The air moving downwardly through the indoor air inlet 207 or the outdoor air inlet 208 of the mixing-duct module 200 exchanges heat with the evaporator 150 and the condenser 130 while moving in the horizontal direction in the air-conditioning module 100. The air flows into the two zones, namely the upper passageway 103 and the lower passageway 104, divided by the separator 300.

Figure 7:
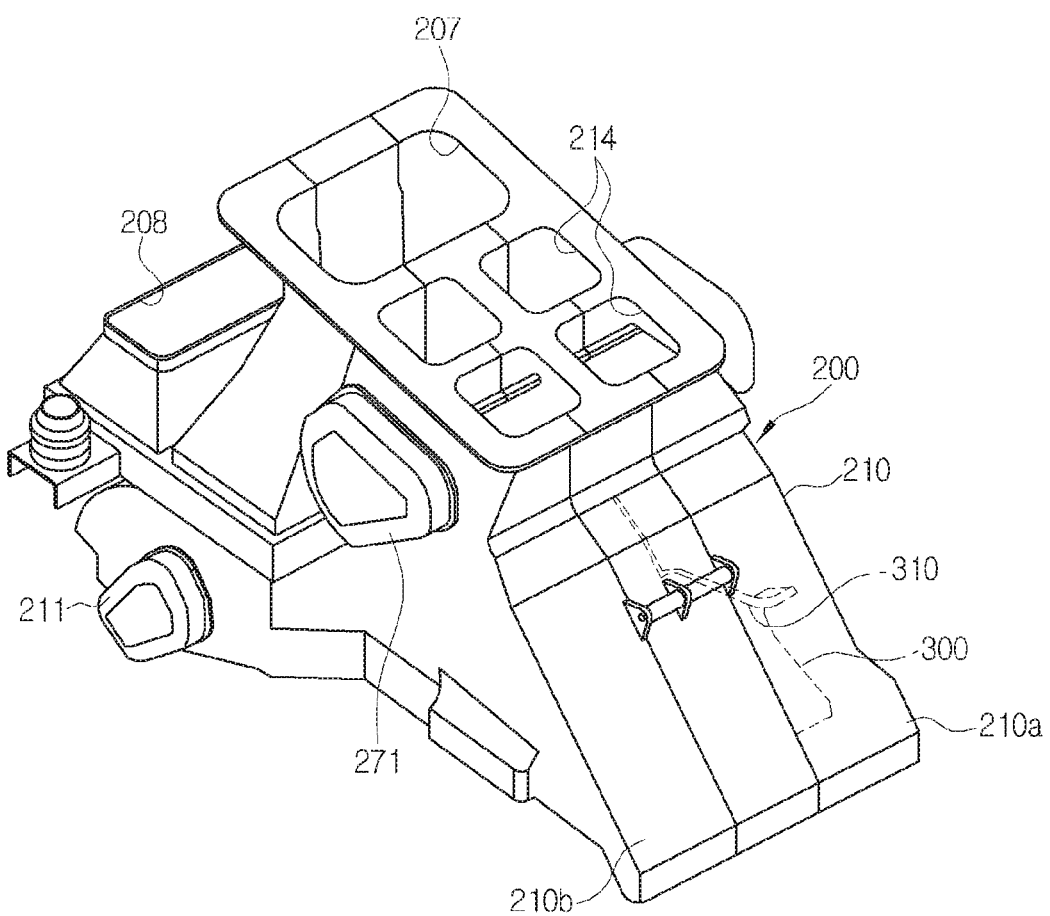
FIG. 7 is a perspective view showing a mixing-duct module of the air conditioner for a vehicle according to the preferred embodiment of the present invention.
Figure 8:
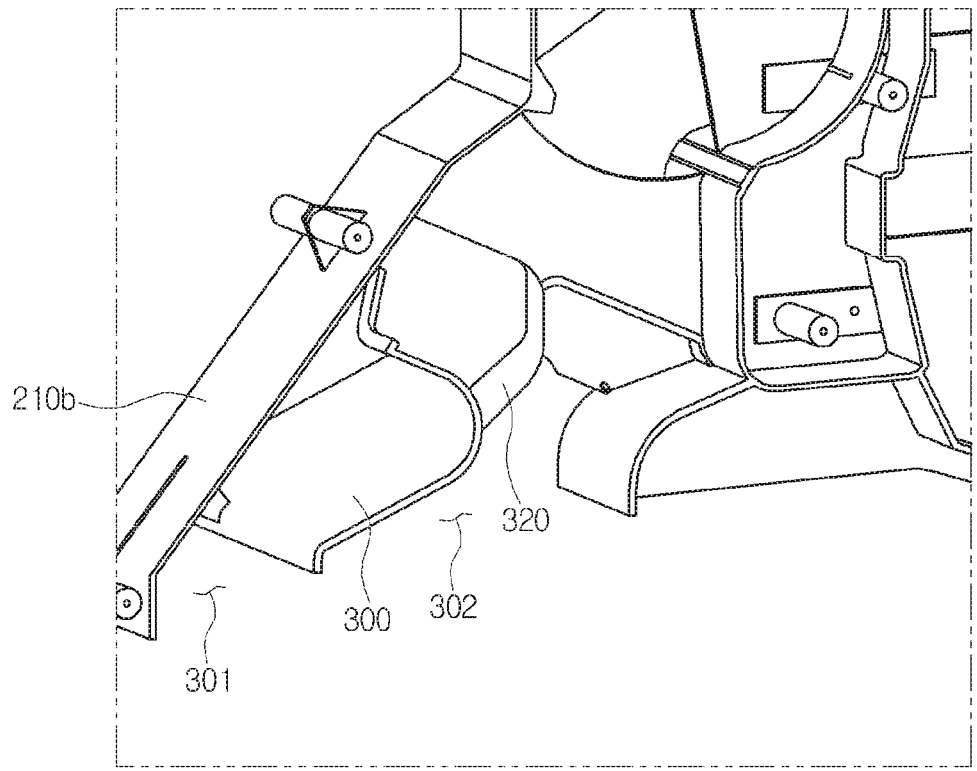
FIG. 8 is a perspective view showing the inside of a mixing-duct case showing a separator of the air conditioner for a vehicle according to the preferred embodiment of the present invention.
Figure 10:
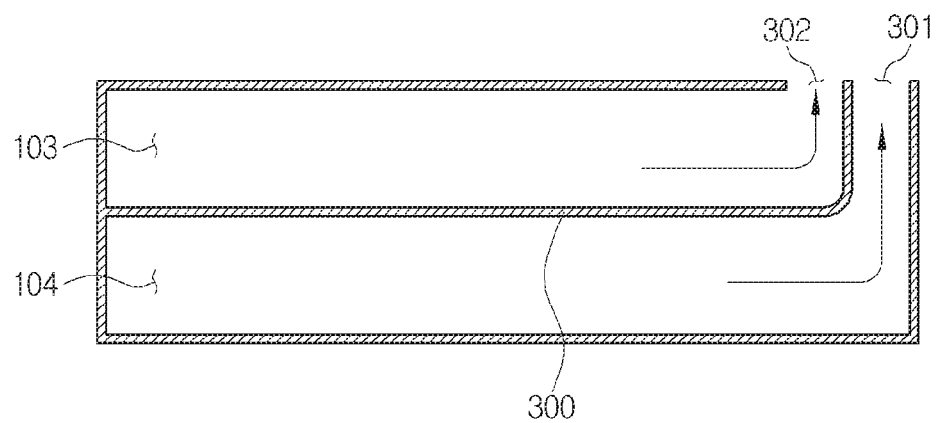
FIG. 10 is a side sectional view showing the separator of the air conditioner for a vehicle according to the preferred embodiment of the present invention.
Figure 11:
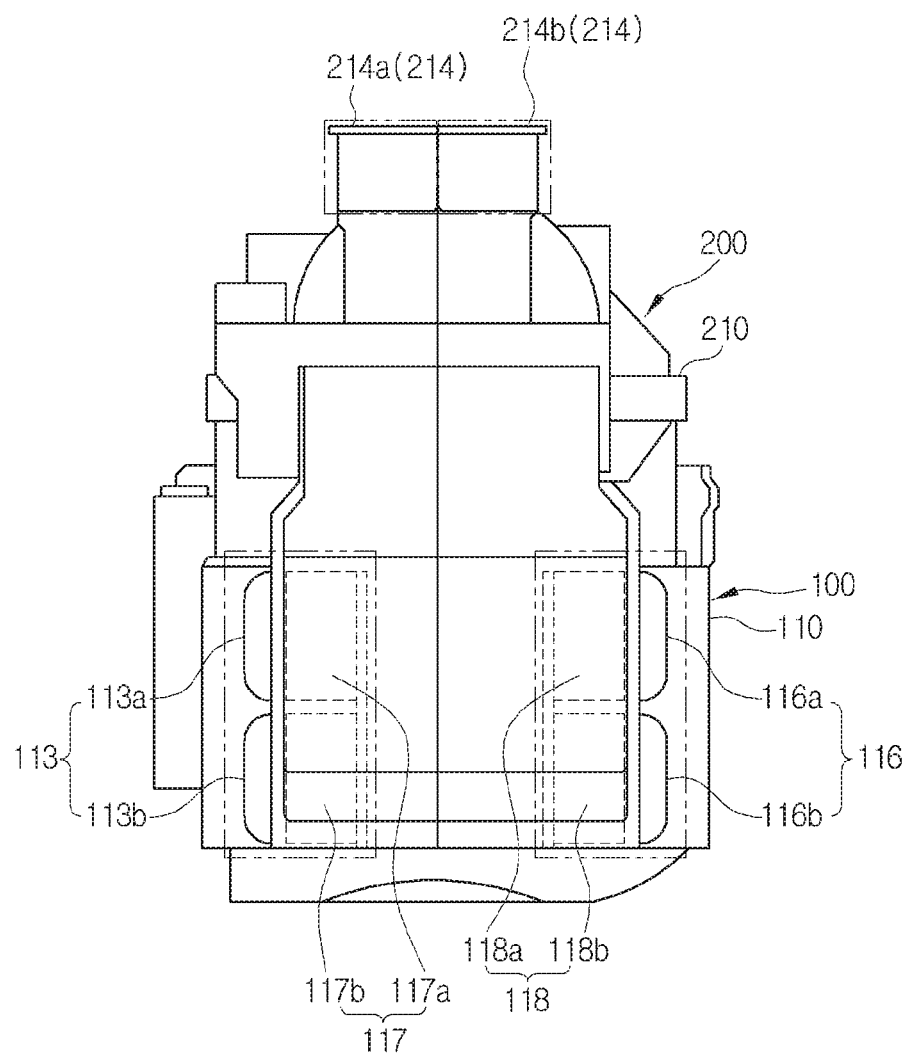
FIG. 11 is a front view showing the air conditioner for a vehicle according to the preferred embodiment of the present invention.

The communication passageway 114 is divided into a first communication passageway 301 and a second communication passageway 302 by the separator 300. That is, as shown in FIG. 10, the separator 300 extends from the air-conditioning case 110 of the air-conditioning module 100 in the horizontal direction and divides the upper passageway 103 and the lower passageway 104. Moreover, the separator 300 extends upwardly from the cold air mode door 118 and the warm air mode door 117, and divides the upper passageway 103 and the lower passageway 104 in the back-and-forth direction of the vehicle as shown in FIGS. 7 and 8.

The air flowing in the lower passageway 104 is guided upwards after passing the first communication passageway 301, and is discharged to one among the driver's seat and the passenger's seat. The air flowing in the upper passageway 103 is guided upwards after passing the second communication passageway 302, and is discharged to the other one among the driver's seat and the passenger's seat.

That is, the air flowing in the lower passageway 104 is discharged to the outside through the lower cold air discharge hole 116b or the lower warm air discharge hole 113b by control of the lower cold air mode door 118b or the lower warm air mode door 117b, or is guided upwards after passing the first communication passageway 301 and is discharged to one among the driver's seat and the passenger's seat.

In addition, the air flowing in the upper passageway 103 is discharged to the outside through the upper cold air discharge hole 116a or the upper warm air discharge hole 113a by control of the upper cold air mode door 118a or the upper warm air mode door 117a, or is guided upwards after passing the second communication passageway 302 and is discharged to the other one among the driver's seat and the passenger's seat.

The air conditioner for a vehicle includes a control unit. The control unit controls operations of various doors, the blower unit, and others of the air conditioner including the cold air mode door 118 and the warm air mode door 117. If air discharge toward the driver's seat or the passenger's seat is off, the control unit controls to discharge the air of the off-state side to the outside. Finally, an air volume of an on-state side remains constant independently relative to the air volume of the off-state side.

The air flowing in the first air passageway 101 and the second air passageway 102 of the upper passageway 103 is guided to be discharged to one among the driver's seat and the passenger's seat. Moreover, the air flowing in the first air passageway 101 and the second air passageway 102 of the lower passageway 104 is guided to be discharged to the other one among the driver's seat and the passenger's seat.

The air flow of the first air passageway 101 and the second air passageway 102 passing the evaporator 150 and the condenser 130 is formed in the horizontal direction, and the air flow toward the interior of the vehicle from the downstream side of the cold air mode door 118 and the warm air mode door 117 is formed in the upward direction. The first air passageway 101 and the second air passageway 102 is configured in such a way that cold air and warm air are mixed together during the air flowing process that the air flows upwardly from the downstream side of the cold air mode door 118 and the warm air mode door 117. The upper passageway 103 and the lower passageway 104 are divided in the back-and-forth direction of the vehicle by the separator 300 at the downstream side of the cold air mode door 118 and the warm air mode door 117.

Referring to FIGS. 7 and 8, the mixing-duct case 210 is formed by a right mixing-duct case 210a and a left mixing-duct case 210b combined with each other in the right-and-left direction. The separator 300 formed on the right mixing-duct case 210a has a first inclined part 310, and the separator 300 formed on the left mixing-duct case 210b has a second inclined part 320.

Figure 9:
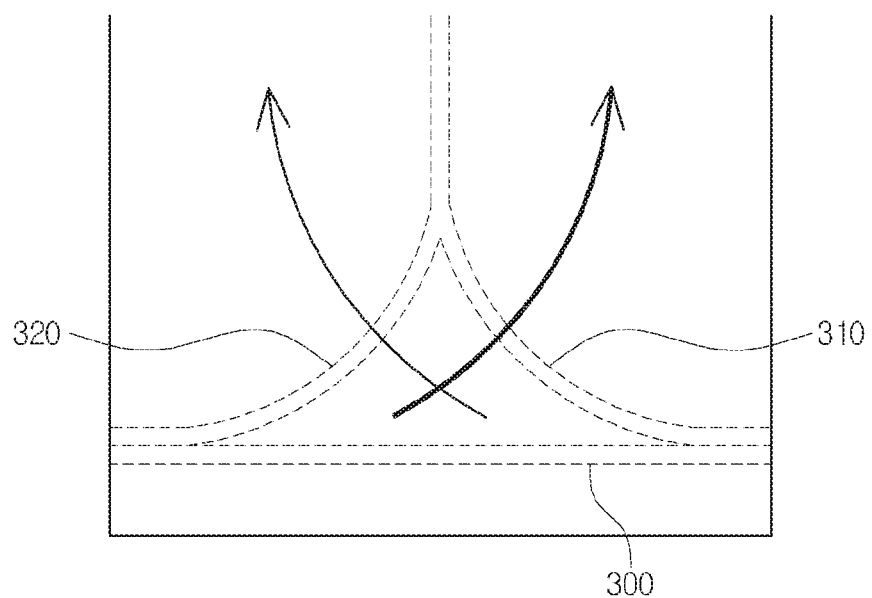
FIG. 9 is a front view showing the separator of the air conditioner for a vehicle according to the preferred embodiment of the present invention.

Referring to FIG. 9, the first inclined part 310 guides the cold air, the warm air, or mixed air of the warm air and the cold air, which passes the first communication passageway 301 after passing the lower passageway 104, to the left, and discharges the air through the air outflow hole 214 of the left side (driver's seat). The second inclined part 320 guides the cold air, the warm air, or mixed air of the warm air and the cold air, which passes the second communication passageway 302 after passing the upper passageway 103, to the right, and discharges the air through the air outflow hole 214 of the right side (passenger's seat).

Figure 12:
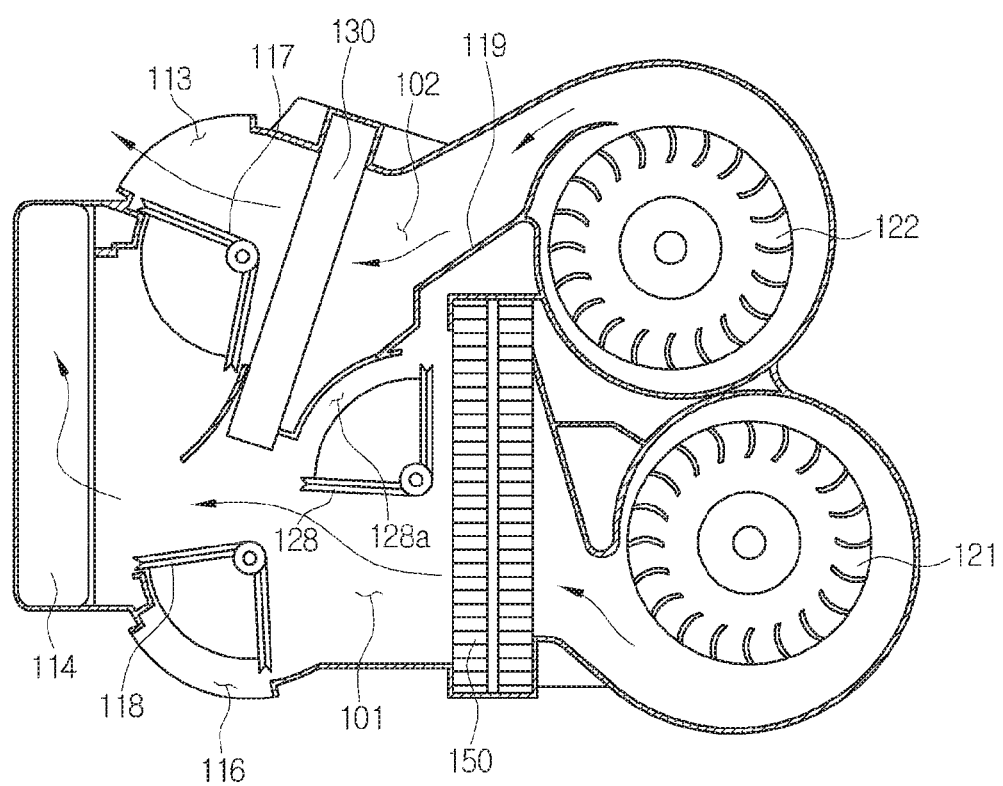
FIG. 12 is a view showing a cooling mode of the air conditioner for a vehicle according to the preferred embodiment of the present invention.
Figure 13:
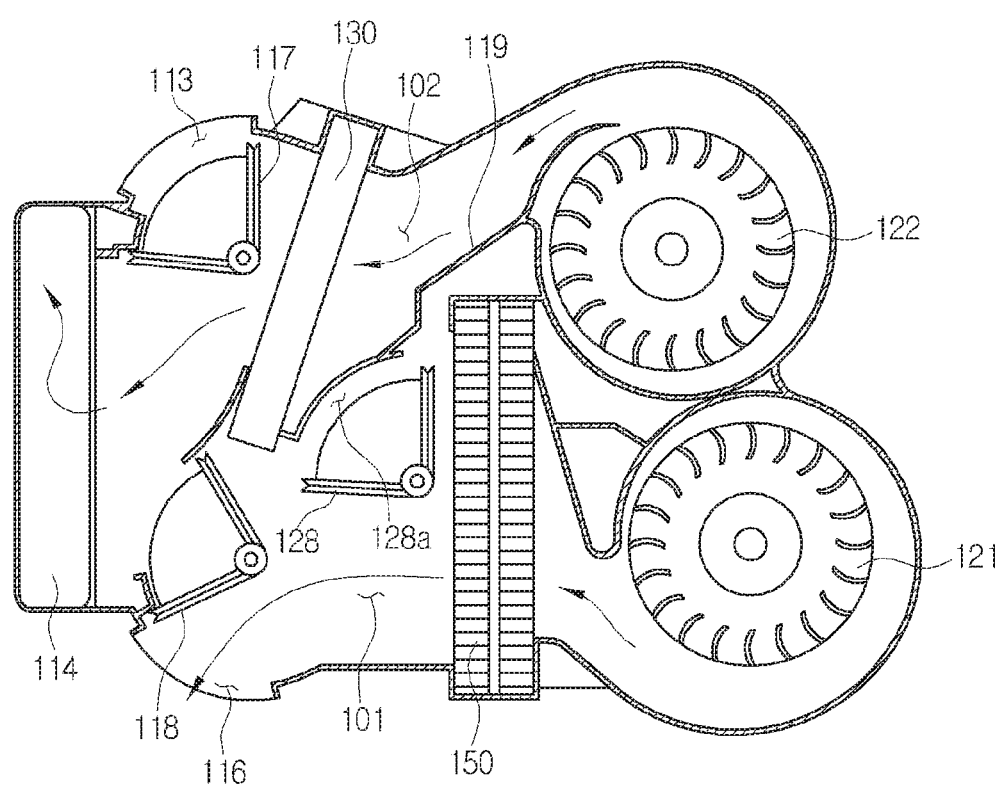
FIG. 13 is a view showing a heating mode of the air conditioner for a vehicle according to the preferred embodiment of the present invention.
Figure 14:
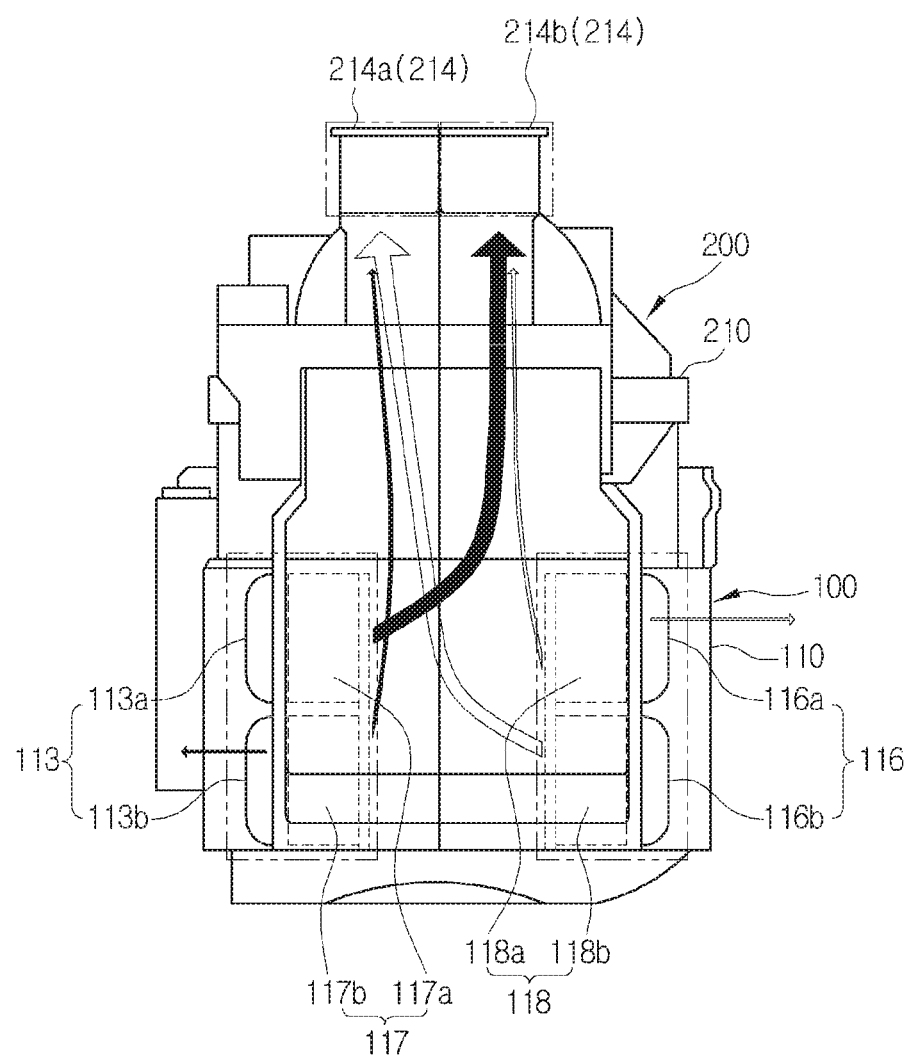
FIGS. 14 and 15 are views showing a used example of right and left independent air-conditioning of the air conditioner for a vehicle according to the preferred embodiment of the present invention.
Figure 15:
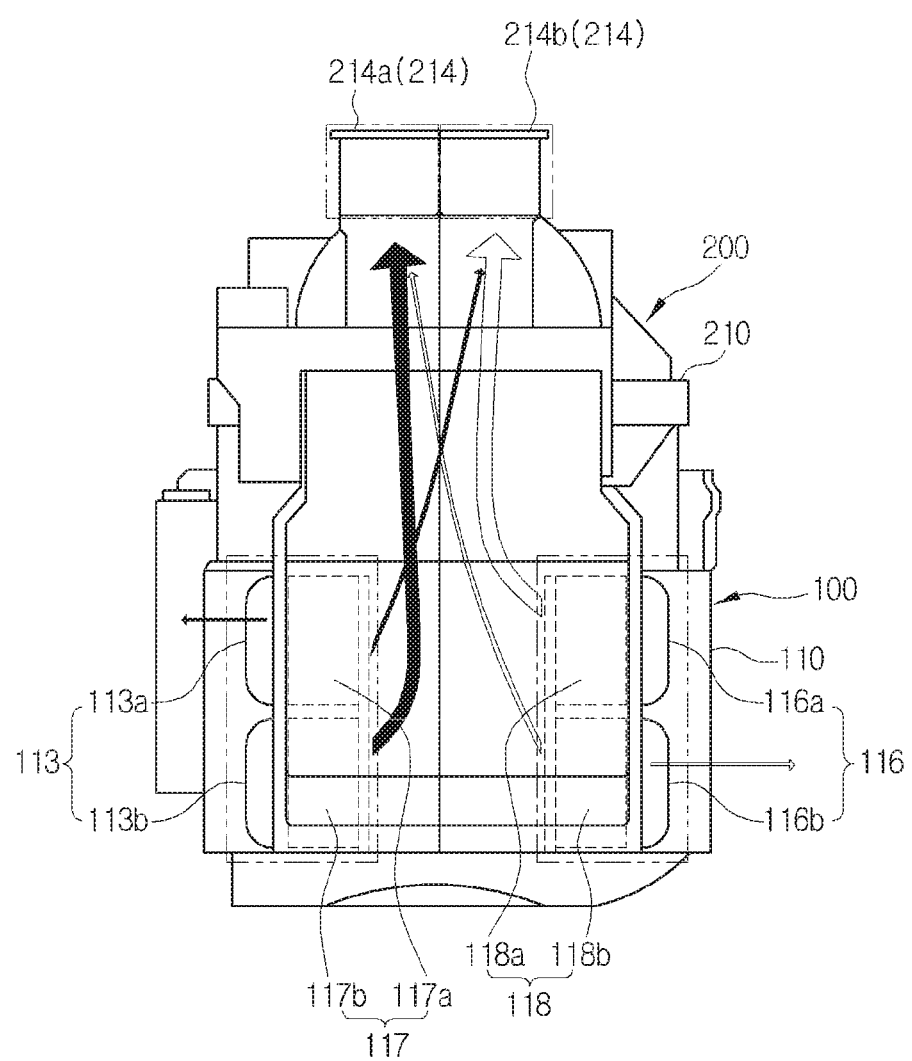

FIG. 12 is a view showing a cooling mode of the air conditioner for a vehicle according to the preferred embodiment of the present invention, FIG. 13 is a view showing a heating mode of the air conditioner for a vehicle according to the preferred embodiment of the present invention, and FIGS. 14 and 15 are views showing a used example of right and left independent air-conditioning of the air conditioner for a vehicle according to the preferred embodiment of the present invention.

Referring to FIG. 12, in the cooling mode, the indoor air is introduced into the first air passageway 101, exchanges heat with the evaporator 150, and then, is cooled. The cold air mode door 118 is rotated to close the cold air discharge hole 116 and open the flow path toward the communication passageway 114. The cooled air passes through the communication passageway 114, and is circulated to the interior of the vehicle through the air outflow holes 214 of the mixing-duct module 200. In this instance, the cold air mode door 118 is controlled in such a way that the upper cold air mode door 118a and the lower cold air mode door 118b respectively close the upper cold air discharge hole 116a and the lower cold air discharge hole 116b, and the cooled airs pass the upper passageway 103 and the lower passageway 104, are moved through the first communication passageway 301 and the second communication passageway 302, and then, are respectively supplied to the right side and the left side of the interior of the vehicle.

At the same time, the outdoor air is introduced into the second air passageway 102, exchanges heat with the condenser 130, and then, is heated. The warm air mode door 117 is rotated to close the communication passageway 114 and open the warm air discharge hole 113. The heated air is discharged to the outside through the warm air discharge hole 113. In this instance, the warm air mode door 117 is controlled in such a way that the upper warm air mode door 117a and the lower warm air mode door 117b respectively open the upper warm air discharge hole 113a and the lower warm air discharge hole 113b, and the heated airs are respectively discharged to the outside of the vehicle through the upper warm air discharge hole 113a and the lower warm air discharge hole 113b.

Referring to FIG. 13, in the heating mode, the indoor air is introduced into the second air passageway 102, exchanges heat with the condenser 130, and then, is heated. The warm air mode door 117 is rotated to close the warm air discharge hole 113 and open the communication passageway 114. The heated air passes through the communication passageway 114, and is circulated into the interior of the vehicle through the air outflow holes 214 of the mixing-duct module 200. In this instance, the warm air mode door 117 is controlled in such a way that the upper warm air mode door 117a and the lower warm air mode door 117b respectively close the upper warm air discharge hole 113a and the lower warm air discharge hole 113b, and the heated airs respectively pass the upper passageway 103 and the lower passageway 104 and are moved through the first communication passageway 301 and the second communication passageway 302 so that warm air is supplied to the right side and the left side of the interior of the vehicle.

At the same time, the outdoor air is introduced into the first air passageway 101, exchanges heat with the evaporator 150, and then, is cooled. The cold air mode door 118 is rotated to close the communication passageway 114 and open the cold air discharge hole 116. The cooled air is discharged to the outside of the vehicle through the cold air discharge hole 116. In this instance, the cold air mode door 118 is controlled in such a way that the upper cold air mode door 118a and the lower cold air mode door 118b respectively open the upper cold air discharge hole 116a and the lower cold air discharge hole 116b, and the cooled airs are respectively discharged to the outside of the vehicle through the upper cold air discharge hole 116a and the lower cold air discharge hole 116b.

Referring to FIG. 14, the air introduced into the first air passageway 101 exchanges heat with the evaporator 150, and then, the air of the upper passageway 103 of the first air passageway 101 is discharged to the outside through the upper cold air discharge hole 116a, and the air of the lower passageway 104 moves upwardly through the first communication passageway 301 and is guided by the first inclined part 310 of the separator 300 so as to be supplied to the interior of the vehicle through an air outflow hole 214a of the left side. At the same time, the air introduced into the second air passageway 102 exchanges heat with the condenser 130, and then, the air of the upper passageway 103 of the second air passageway 102 moves upwardly through the second communication passageway 302 and is guided by the second inclined part 320 of the separator 300 so as to be supplied to the interior of the vehicle through an air outflow hole 214b of the right side, and the air of the lower passageway 104 is discharged to the outside through the lower warm air discharge hole 113b.

In this instance, the degree of opening of the upper cold air discharge hole 116a can be adjusted by control of the upper cold air mode door 118a, some of the cold air which is not discharged through the upper cold air discharge hole 116a is mixed with the warm air flowing in the upper passageway 103 while moving upwardly through the second communication passageway 302, and then, is discharged to the interior of the vehicle. Additionally, the degree of opening of the lower warm air discharge hole 113b can be adjusted by control of the lower warm air mode door 117b, some of the warm air which is not discharged through the lower warm air discharge hole 113b is mixed with the cold air flowing in the lower passageway 104 while moving upwardly through the first communication passageway 301, and then, is discharged to the interior of the vehicle.

Referring to FIG. 15, the air introduced into the first air passageway 101 exchanges heat with the evaporator 150, and then, the air of the lower passageway 104 of the first air passageway 101 is discharged to the outside through the lower cold air discharge hole 116b, and the air of the upper passageway 103 moves upwardly through the second communication passageway 302 and is supplied to the interior of the vehicle through an air outflow hole 214b of the right side. At the same time, the air introduced into the second air passageway 102 exchanges heat with the condenser 130, and then, the air of the lower passageway 104 of the second air passageway 102 moves upwardly through the first communication passageway 301 and is supplied to the interior of the vehicle through an air outflow hole 214a of the left side, and the air of the upper passageway 103 is discharged to the outside through the upper warm air discharge hole 113a.

In this instance, the degree of opening of the lower cold air discharge hole 116b can be adjusted by control of the lower cold air mode door 118b, some of the cold air which is not discharged through the lower cold air discharge hole 116b is mixed with the warm air flowing in the lower passageway 104 while moving upwardly through the first communication passageway 301, and then, is discharged to the interior of the vehicle. Additionally, the degree of opening of the upper warm air discharge hole 113a can be adjusted by control of the upper warm air mode door 117a, some of the warm air which is not discharged through the upper warm air discharge hole 113a is mixed with the cold air flowing in the upper passageway 103 while moving upwardly through the second communication passageway 302, and then, is discharged to the interior of the vehicle.

The air conditioner for a vehicle according to the present invention can control the air volume and temperature of the right side and the left side, as a passenger wants, through manipulation of a controller or automatic control, and provide constant air-conditioning without any change in air volume of the opposite side even though one among the right side and the left side is turned off.

The invention claimed is:

1. An air conditioner for a vehicle comprising:
a first air passageway and a second air passageway separated from one another by a partition wall;
a cooling heat exchanger disposed in the first air passageway and a heating heat exchanger disposed in the second passageway;
the first air passageway defining a cold air discharge hole allowing air to escape the vehicle, and the second air passageway defining a warm air discharge hole allowing air to escape the vehicle;
wherein the first air passageway and the second air passageway are divided into an upper passageway and a lower passageway by a separator such that the cold air discharge hole includes an upper cold air discharge hole along the upper passageway above the separator, and a lower cold air discharge hole along the lower passageway below the separator, and the warm air discharge hole includes an upper warm air discharge hole along the upper passageway above the separator, and a lower warm air discharge hole along the lower passageway below the separator;
an upper cold air mode door configured to open and close the upper cold air discharge hole, and a lower cold air mode door configured to open and close the lower cold air discharge hole;
an upper warm air mode door configured to open and close the upper warm air discharge hole, and a lower warm air mode door configured to open and close the lower warm air discharge hole;
wherein air flowing through the upper passageway is discharged outside of the air conditioner through the upper cold air discharge hole or the upper warm air discharge hole, or is discharged to one of a driver's seat and a passenger's seat through at least one of a plurality of air outflow holes based on positions of the upper warm and cold air mode doors;
wherein air flowing through the lower passageway is discharged outside of the air conditioner through the lower cold air discharge hole or the lower warm air discharge hole, or discharged to the other one of the driver's seat or the passenger's seat through at least one of the plurality of air outflow holes based on positions of the lower warm and cold air mode doors.

2. The air conditioner according to claim 1, wherein the cold air discharge hole and the warm air discharge hole are respectively formed at right and left sides of the case in a width direction of the vehicle.

3. The air conditioner according to claim 1, wherein the first air passageway and the second air passageway are partitioned from each other in right-and-left direction by a partition wall.

4. The air conditioner according to claim 1, wherein the cooling heat exchanger and the heating heat exchanger are vertically divided into two by the separator.

5. The air conditioner according to claim 1, wherein the upper cold air mode door and the lower cold air mode door are operated independently relative to one another, and wherein the upper warm air mode door and the lower warm air mode door are operated independently.

6. The air conditioner according to claim 1, further comprising: a control unit configured to control movement of the upper and lower warm air mode doors, and configured to transfer air through specific ones of the air discharge holes when an off-state is selected at one of the driver's seat and the passenger's seat via opening of specific ones of the upper and lower warm air mode doors.

7. The air conditioner according to claim 1, wherein the first air passageway extends in a horizontal direction along the cooling heat exchanger, and the second air passageway extends in a horizontal direction along the heating heat exchanger such that air flowing in the first and second passageways flows in the horizontal direction, and wherein the air outflow holes are at least partially formed in an upward direction such that air flowing to the interior of the vehicle from a downstream side of the cold air mode doors and the warm air mode doors flows in the upward direction.

8. The air conditioner according to claim 7, wherein the first air passageway and the second air passageway are formed in such a way that the cold air and the warm air are mixed together during an air flow process where air flows upwardly at a downstream side of the cold air mode doors and the warm air mode doors.

9. The air conditioner according to claim 8, wherein the upper passageway and the lower passageway are divided in a back-and-forth direction of the vehicle by the separator at the downstream side of the cold air mode doors and the warm air mode doors.

10. The air conditioner according to claim 1, wherein an air-conditioning module in which the first air passageway and the second air passageway, an intake module for introducing at least one among the indoor air and the outdoor air into the first air passageway and the second air passageway, and a distributor module, which includes the separator and discharges the air passing at least one among the cooling heat exchanger and the heating heat exchanger to parts of the interior of the vehicle, are all arranged outside of the vehicle relative to a dash panel.

11. An air conditioner for a vehicle comprising:
a first air passageway and a second air passageway separated from one another by a partition, and each fluidly connected to a plurality of air outflow holes for being fluidly connected to an interior of the vehicle;
a cooling heat exchanger disposed in the first air passageway and not disposed in the second air passageway;
a heating heat exchanger disposed in the second air passageway and not in the first air passageway;
the first air passageway defining a cold air discharge hole allowing air to escape the air conditioner, and the second air passageway defining a warm air discharge hole allowing air to escape the air conditioner;
the first air passageway and the second air passageway each divided into an upper passageway and a lower passageway by a separator such that the cold air discharge hole is comprised of an upper cold air discharge hole along the first air passageway above the separator and a lower cold air discharge hole along the lower passageway below the separator, and such that the warm air discharge hole is comprised of an upper warm air discharge hole along the first air passageway above the separator and a lower warm air discharge hole along the lower passageway below the separator;
an upper cold air mode door configured to open and close the upper cold air discharge hole such that cold air in the upper passageway is either discharged to the outside through the upper cold air discharge hole or is discharged to at least one of the plurality of air outflow holes;
a lower cold air mode door configured to open and close the lower cold air discharge hole such that cold air in the lower passageway is either discharged to the outside through the lower cold air discharge hole or is discharged to at least one of the plurality of air outflow holes;
an upper warm air mode door configured to open and close the upper warm air discharge hole such that warm air in the upper passageway is either discharged to the outside through the upper warm air discharge hole or is discharged to at least one of the plurality of air outflow holes;
a lower warm air mode door configured to open and close the lower warm air discharge hole such that warm air in the lower passageway is either discharged to the outside through the lower warm air discharge hole or is discharged to at least one of the plurality of air outflow holes.

12. The air conditioner according to claim 1, wherein the cooling heat exchanger is not disposed in the second air passageway, and wherein the heating heat exchanger is not disposed in the first air passageway.

* * * * *